Oct. 23, 1951     A. L. CHRISTIANSEN     2,572,316
FISH SPLITTING MACHINE
Filed Jan. 11, 1946     2 SHEETS—SHEET 2
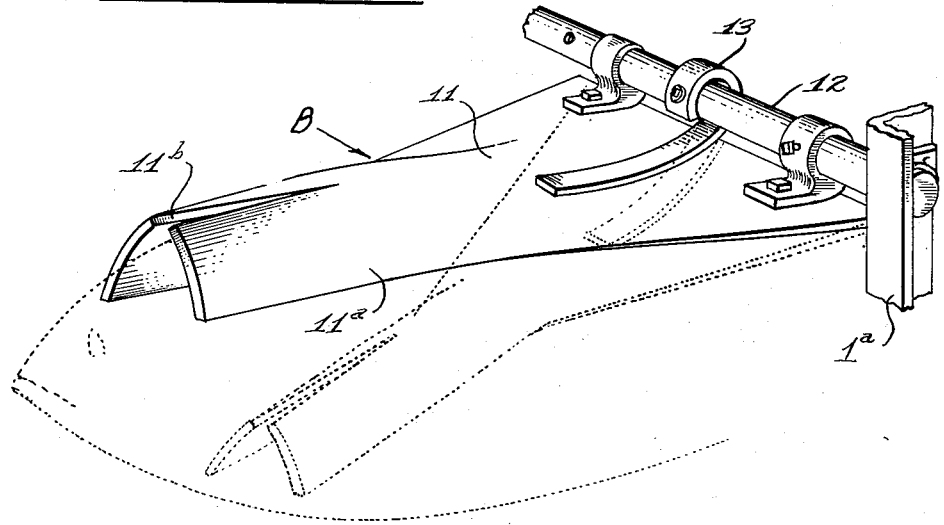
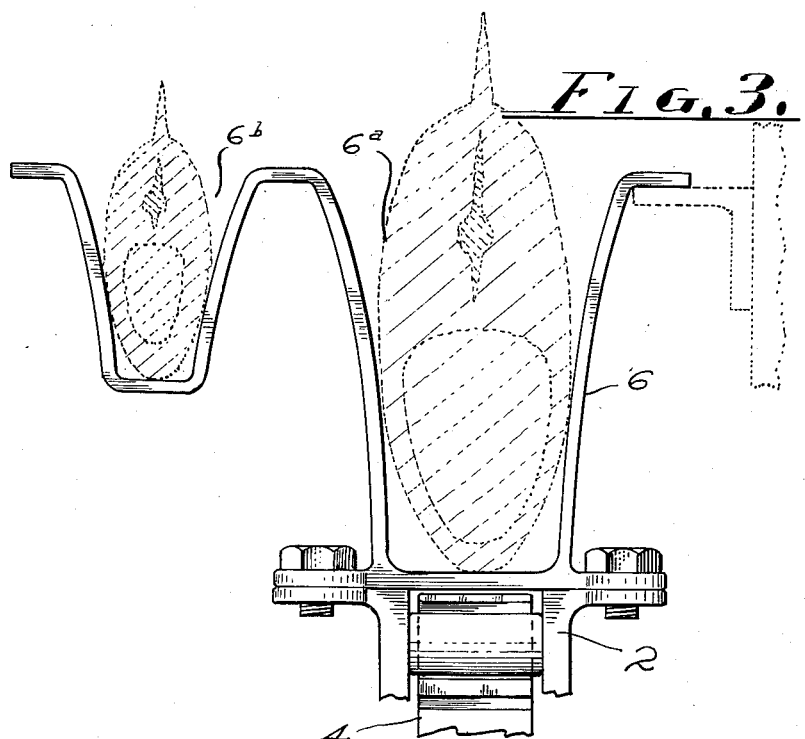
INVENTOR.
A. L. CHRISTIANSEN
BY
ATTORNEY Patented Oct. 23, 1951

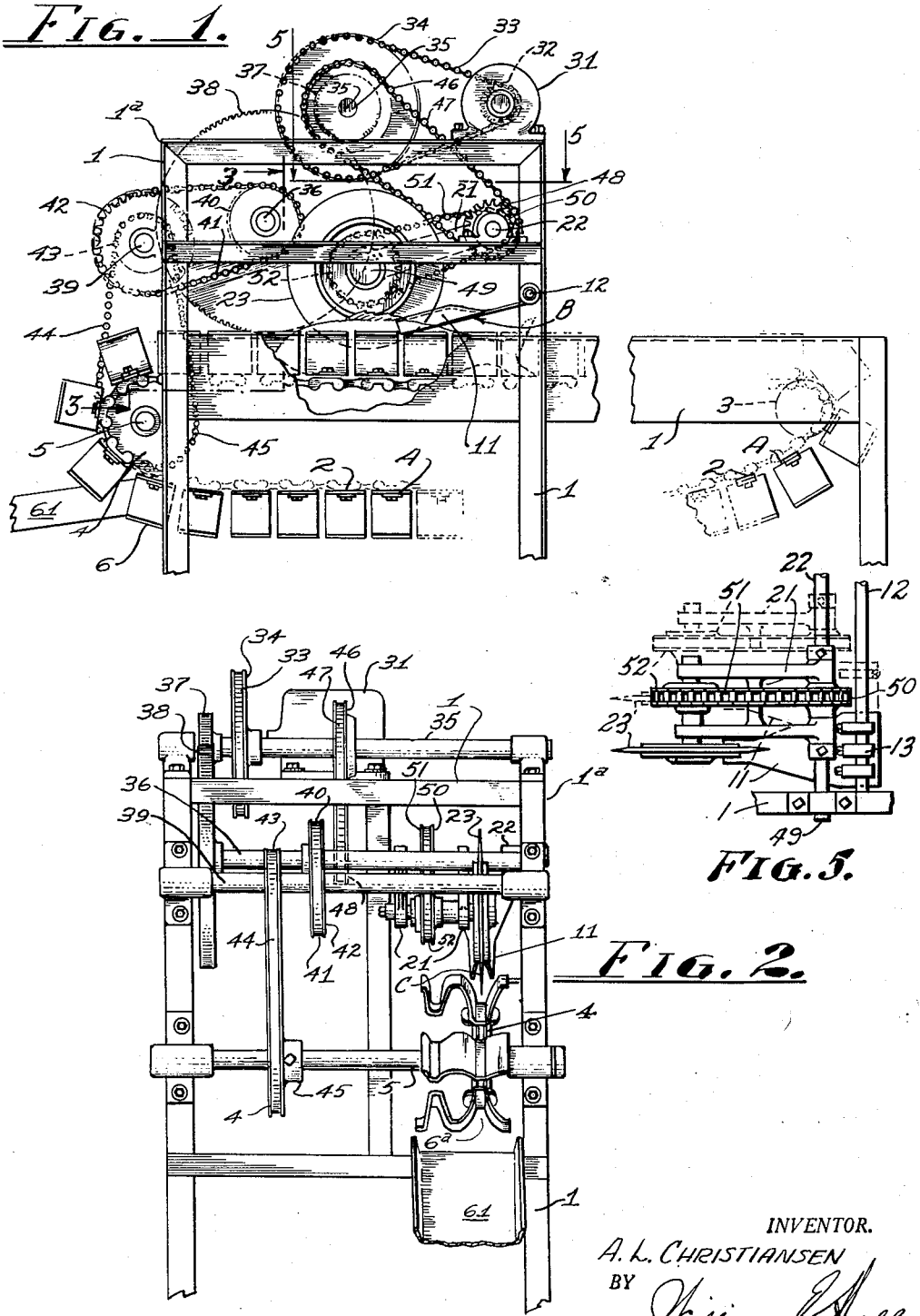

2,572,316

UNITED STATES PATENT OFFICE 2,572,316

FISH SPLITTING MACHINE

Andrew L. Christiansen, Willowbrook, Calif.

Application January 11, 1946, Serial No. 640,454

2 Claims. (Cl. 17—4)

My present invention relates to a fish machine particularly adapted for splitting or dividing fish.

One of the principal objects of this invention is to provide a machine of this class in which the fish may be fed at one end, and split or divided longitudinally after the fish pass through the machine, and in which the efficiency and speed of so splitting or dividing fish is limited only by the speed of the conveyor and the rate of feeding fish to such conveyor.

Another important object of this invention is to provide a machine of this class which is particularly simple and economical of construction, proportionate to its functions, and also a machine of this class which is simple and economical to operate.

An important object also of this invention is to provide simple means which will automatically align the fish, being fed through the machine, with the cutter adapted to perform the splitting or dividing operation.

A further important object of this invention is to provide a machine of this class which may be readily adapted for receiving and splitting different sizes of fish, or a machine of this class which may be readily converted so that it may receive and split fish of such different sizes.

With these and other objects in view, as will appear hereinafter, I have devised a fish splitting or dividing machine having certain novel features of construction, combination, and arrangement of parts and portions, as will be hereinafter described in detail and particularly set forth in the appended claims, reference being had to the accompanying drawings and to the characters of reference thereon, which form a part of this application, in which.

Fig. 1 is a side elevational view of my machine in a preferred form;

Fig. 2 is a rear elevational view thereof;

Fig. 3 is an enlarged fragmentary sectional view thereof, taken through 3—3 of Fig. 1, showing the construction of the fish conveyor;

Fig. 4 is an enlarged perspective view of the fish-centering means in solid and dotted line positions; and Fig. 5 is a sectional plan view, taken on line 5—5 of Fig. 1.

My fish machine, as shown in the drawings, is carried on a frame 1 which has at one end a superstructure 1a. On the frame is carried a continuous link belt conveyor A, substantially coextensive with the length of the frame, but short on the front or feed end and extended slightly beyond the rear end. Fish are adapted to be carried lengthwise in this conveyor and adapted to be centrally located therein by centering means B, and are split while so carried in the conveyor by a knife means C.

The conveyor consists of a link belt 2 mounted on sprockets 3 and 4, the latter or rear sprocket being mounted on a shaft 5.

The link belt 2 carries a plurality of cleats 6, each of which consists of channel portions of different sizes, Fig. 3 showing cleats of two channel portions, 6a and 6b. Channels of other sizes may also be provided in the same cleat. The cleats are preferably secured to the belt 2 by the large channel portions, as shown in Fig. 3. The larger channel portions 6a of the adjacent cleats are aligned with each other to form a continuous channel member, particularly at the top or upper run of the conveyor or conveying means. Likewise, the adjacent or smaller channel portions 6b form a continuous channel member alongside the former.

On the superstructure 1a of the frame is mounted the fish-centering means, which, as shown, consists of an arm 11. The arm is pivotally mounted at one end on a transverse rod 12 carried by the forward portion of the superstructure 1a of the frame. This arm is normally forced downwardly by a spring 13. At the free end of the arm is an inverted U-shaped portion 11a, which extends in the direction of movement of the conveyor, and is adapted to be positioned over one of the channels in the conveyor. At the free end of the arm is a slot 11b, shown best in Fig. 4, for the purpose hereinafter to be described.

On the superstructure 1a of the frame is also mounted a cutter-carrying frame 21, the same being mounted on a shaft 22. At the free end of the frame 21 is a circular cutter 23, which is adapted normally to fall by gravity into one of the channels of the conveyor through the slot 11b of the arm 11.

As here shown, both the fish-centering arm 11 and the circular knife or cutter 23 may be moved laterally or axially on their respective supporting rods or shafts 12 and 22, so that they may be positioned in any of the channels of the conveyor. The centering member 11 and the spring 13 are held in position on the rod 12 by set screws which permit axial adjustment on the rod; and the cutter 23 is similarly axially adjusted on the shaft 22 with its supporting frame 21.

The whole mechanism of my machine is operated by a motor 31, which, through a sprocket 32, a chain 33, and a sprocket 34, operates a shaft 35. This shaft 35 is operatively connected to a shaft 36 through gears 37 and 38. The shaft 36 operates a shaft 39 through a sprocket 40, a chain 41, and a sprocket 42. Again, the shaft 39 rotates the shaft 5 through a sprocket 43, a chain 44, and a sprocket 45 mounted on the shaft 5. Thus, the conveyor 2 is operated by the motor 31.

The shaft 35, mentioned above, rotates the shaft 22, upon which the knife or cutter-carrying frame 21 is mounted, by means of a sprocket 46, a chain 47, and a sprocket 48. The shaft 22 operates the shaft 49, carrying the circular knife 23, through a sprocket 50, a chain 51, and a sprocket 52. Thus, the circular knife 23 is also operated by the motor 31.

The fish may be manually fed into the channel members of the conveyor at the front of the machine and carried therefrom under the fish-centering means and the fish-splitting means. The upper run of the conveyor means is preferably held in a horizontal position by any suitable means desired.

As shown, the split fish are discharged from the opposite or discharge end of the conveying means and are deposited into a chute 61, or other suitable receptacle.

Though I have shown and described a particular construction, combination, and arrangement of parts and portions, I do not wish to be limited to the same, but desire to include in the scope of my invention the construction, combination, and arrangement substantially as set forth in the appended claims.

I claim:

1. In a machine of the class described, a continuous conveying means having a plurality of substantially V-shaped channel members of various sizes positioned adjacent each other and extending longitudinally with respect to the direction of movement of the conveying means, fish-centering means on the frame for centering fish carried in said channel members and fish-splitting means in association with and behind the former means adapted to split the fish carried in the channel members of the conveying means, the fish-splitting means being adjustable laterally and mounted in such a manner as to be lowered into a designated channel member.

2. In a machine of the class described, a continuous conveying means having a plurality of substantially V-shaped channel members of various sizes positioned adjacent each other and extending longitudinally with respect to the direction of movement of the conveying means, fish-centering means on the frame for centering fish carried in said channel members and fish-splitting means in association with and behind the former means adapted to split the fish carried in the channel members of the conveying means, the fish-centering means being adjustable laterally and mounted in such a manner as to be lowered into a designated channel member, the fish-splitting means being correspondingly laterally adjustable.

ANDREW L. CHRISTIANSEN.

REFERENCES CITED

The following references are of record in the file of this patent:

UNITED STATES PATENTS

| Number | Name | Date |
| --- | --- | --- |
| 346,871 | Shute | Aug. 3, 1886 |
| 1,316,850 | Nicholson | Sept. 23, 1919 |
| 1,362,510 | Reynolds | Dec. 14, 1920 |
| 1,701,455 | Schmidt | Feb. 5, 1929 |
| 1,886,926 | Walter | Nov. 8, 1932 |
| 2,110,416 | David | Mar. 8, 1938 |
| 2,140,575 | David et al. | Dec. 20, 1938 |
| 2,166,939 | Christiansen | July 25, 1939 |
| 2,245,329 | Danielsson | June 10, 1941 |
| 2,246,839 | Christiansen | June 24, 1941 |